United States Patent [19]

Florence

[11] Patent Number: 5,245,146
[45] Date of Patent: Sep. 14, 1993

[54] MOUSE COVER

[76] Inventor: Linda K. Florence, 7818 N. Cameron Ave., Tampa, Fla. 33614

[21] Appl. No.: 843,257

[22] Filed: Feb. 28, 1992

[51] Int. Cl.⁵ ............... H01H 13/04; H01H 3/00
[52] U.S. Cl. ................................ 200/333; 200/329; 200/330; D14/114
[58] Field of Search ............... 200/333, 335, 339, 329, 200/330, 332.1, 332.2, 341, 343, 302.1, 302.2, 302.3, 304; 340/709, 710; D14/114; 33/1 M

[56] References Cited

U.S. PATENT DOCUMENTS 4,298,778  11/1981  Beresford-Jones ............ 200/302.2
4,831,736  5/1989   Bryant, Sr. ................... D14/114
4,880,968  11/1989  Kwang-Chien ................. 340/710
5,051,550  9/1991   Harris ......................... 200/339

Primary Examiner—Henry J. Recla
Assistant Examiner—David J. Walczak
Attorney, Agent, or Firm—John B. Dickman, III

[57] ABSTRACT

A protective cover for a hand operated computer control, sometimes referred to as a "mouse" where the protective cover has a cavity in which the "mouse" is held and shielded from dust and dirt. The cover has pivotal levers with downwardly projecting adjustable projections that contact buttons on the "mouse" to signal commands to a computer.

4 Claims, 2 Drawing Sheets

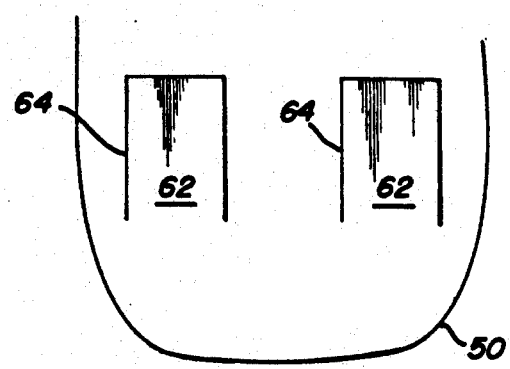
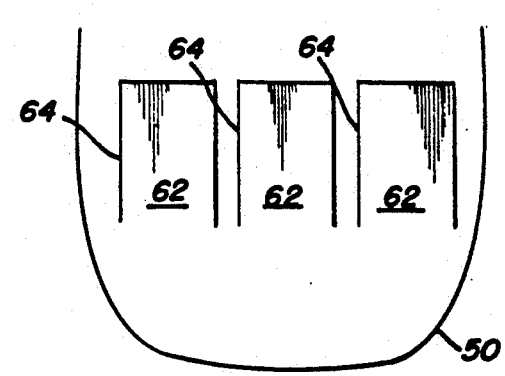
FIG.4    FIG.5
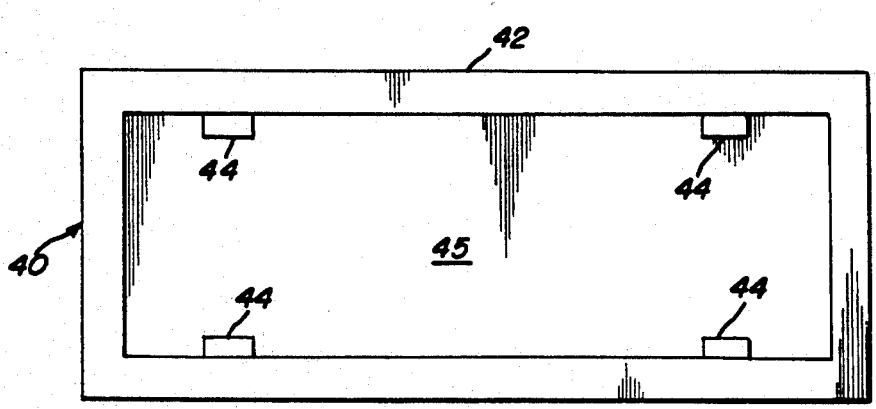
FIG.6
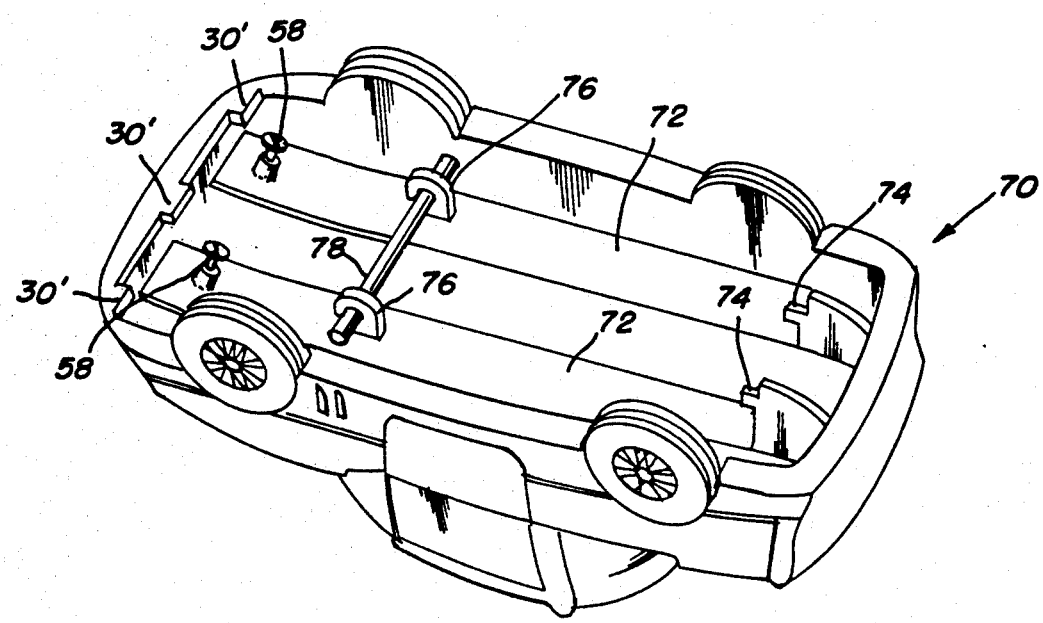
FIG. 7

MOUSE COVER

BACKGROUND OF THE INVENTION

The present invention relates to a protective cover for computer hand controllers, and in particular a protective cover which mounts on a hand controller and protects the controller while in use.

The use of hand controllers for controlling the position of a cursor on a computer display and for generating signals in a computer is well known. One such device is disclosed in U.S. Pat. No. 3,835,464, issued to Rider, where a hand-operated position indicator for a computer controlled display system has a hemispherical housing with a plurality of buttons and a sphere located on a bottom structure supported on the underlying surface. Moving the hand-controller generates signals indicative of the position of the device and the buttons give commands for controlling a CRT display at the appropriate positions. In recent years, the shape of hand controllers has changed to a rectangular shape that is more compact and easy to hold. While the shape has changed, the functions have remained the same, including a bottom surface which has some form of sensor to track the position of the controller and one or more control buttons to permit the user to activate the controller at selected positions relative to a reference point. Generally there is one or more wires connecting the controller to the computer.

All of the hand-controllers contain electronic devices that can be adversely affected by dust and dirt. Although many people cover these hand controllers, now commonly called a "mouse", with soft fabric or vinyl covers to protect them, these covers must be removed when the mouse is to be used. Of course, with the cover removed, particles of dust, dirt, etc. can get into the device which may affect its functions.

There is, therefore, a need for a protective cover that protects the "mouse" and the electronics contained therein. The cover should be designed to mount on the "mouse" and remain on it while the controller is in use. During and after the "mouse" is used, the protective cover must shield it from damaging dust and dirt. In addition, there is a need for the protective cover to have button contacts for activating the one or more buttons found on the "mouse."

In addition to the Rider patent, the inventor is aware of U.S. Pat. No. 4,862,165, issued to Gart. The Gart patent is specifically directed to a hand controller shaped to minimize hand muscle fatigue during a period of use.

The only other prior reference the inventor is aware of is U.S. Des. Pat. 291,203, issued to Silver, which discloses a cover for the hand controller of a computer.

SUMMARY OF THE INVENTION

The present invention provides a protective cover for a hand controller, called a "mouse," of a computer that reduces the possibility of dust and dirt entering the housing of the "mouse" and affecting the "mouse" electronics. The protective cover provides a cavity defined by end and side walls and a top. The bottom opens into the cavity and the "mouse" is inserted into the cavity through the bottom. A cradle device or some other holding device secures the "mouse" in the protective cover.

There is one or more levers as part of the protective cover to contact the operating buttons on the "mouse" to activate the commands to the computer. When pressed these levers contact the buttons on the "mouse." Each lever will have a projection that actually comes into contact with a "mouse" button when the lever is pressed down.

The exterior of the protective cover can be molded to have one of several attractive shapes, including automobiles, animals, boats, etc.

DESCRIPTION OF THE DRAWINGS

FIG. 4 is a top plan view of a section of a protective cover having two lever controls.

FIG. 5 is another embodiment of a top plan view of a section of a protective cover having three lever controls.

FIG. 6 is a plan view of a cradle of the present invention.

FIG. 7 is a perspective view of another embodiment of the invention.

DESCRIPTION OF THE INVENTION

Figure 1:
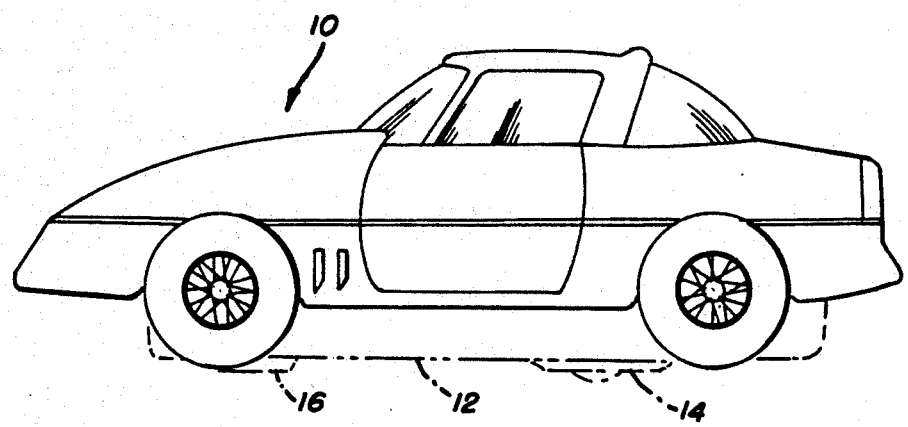
FIG. 1 is a side view of a protective cover of the present invention.
Figure 2:
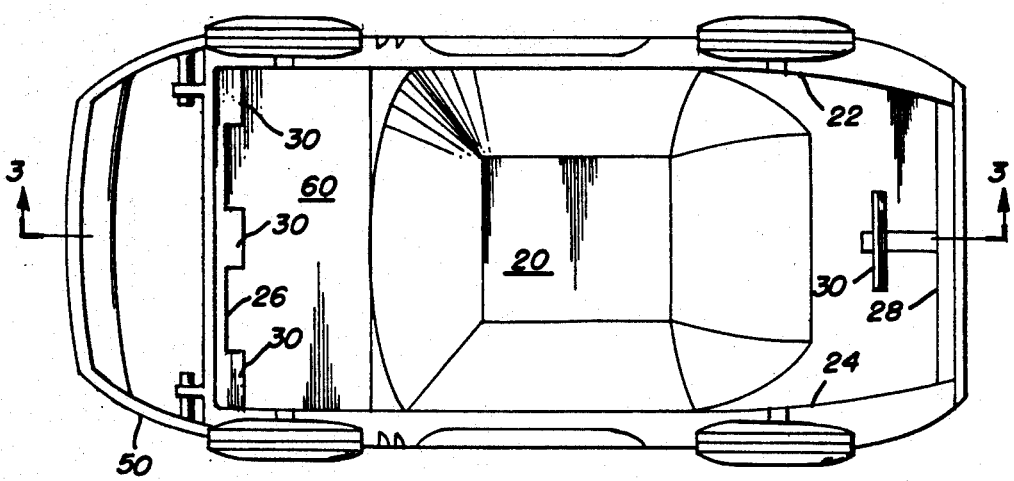
FIG. 2 is a bottom plan view of a protective cover of the present invention.
Figure 3:
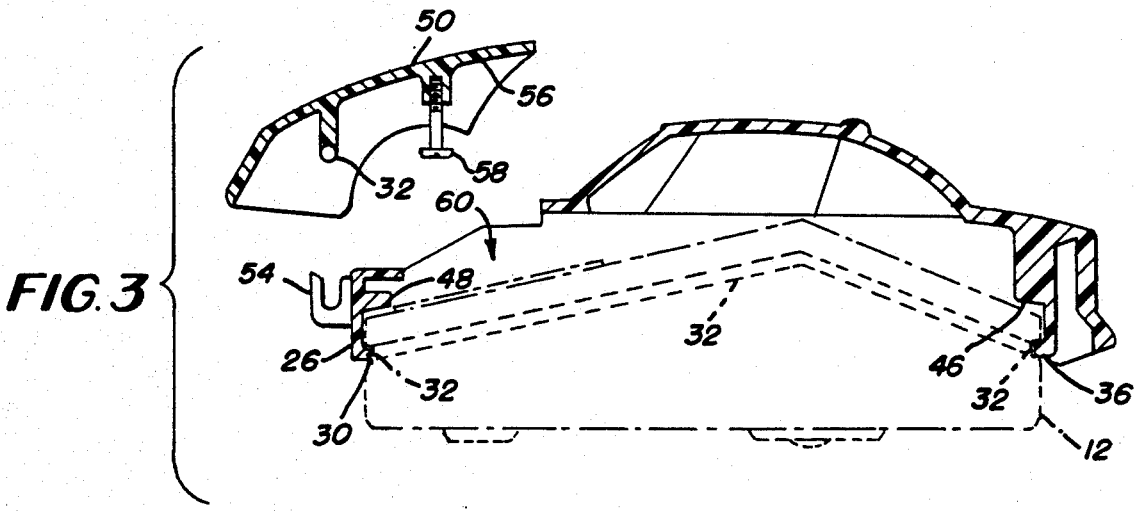
FIG. 3 is a cross sectional view of a protective cover of the present invention taken along the line 3—3 of FIG. 2, showing a section of the cover detached.

Referring to the drawings, FIGS. 1-5, there is shown a protective cover 10 for mounting on a hand controller, "mouse" 12. The protective cover 10 shown in FIG. 1 represents an automobile and is molded of plastic or rubber. The "mouse" 12, partially shown in FIG. 1, has sensors 14 and 16 for sending commands to a computer, not shown. FIG. 3 shows a button 18 which is wired to electronics in the "mouse" 12. The electronics and the wires connecting the mouse to a computer are not shown.

A closer look at FIG. 1 shows that the lower portion of the "mouse" 12 extends beyond the lower edge of the protective cover 10, to expose the sensors 14 and 16. The "mouse" 12 has at least one indent 32 on the front end and another indent 32 on the rear end, the indents 32 are shown in FIG. 3.

The bottom of the protective cover 10, FIG. 2, provides a cavity 20 surrounded by side walls 22 and 24 and end walls 26 and 28. Molded into the end walls 26 and 28 are detents 30 that snap into the indents 32 of "mouse" 12. There is a single detent 36 on end wall 28 and three detents 30 on end wall 26. The detents 30 and detent 36 are shown connected in FIG. 3, the end wall 28 flexes to permit the detent 36 to snap into indent 32 on "mouse" 12.

To support different "mouse" covers on other "mouses" a universal cradle 40 is provided. FIG. 6 shows a cradle plate with detents 44 and an opening 45. The "mouse", not shown, extends through the opening 45 and the detents 44 on the cradle plate snap into detents on the "mouse". The cradle 40 connects to protective cover 10 by snapping the edges of the cradle under the detents 30 and 36.

Attaching the "mouse" 12 to protective cover 10, with or without cradle 40, is aided by stops 46 on the end wall 28 and stops 48 on end wall 26. Stops 46 and 48 are rests against which the surface of "mouse" 12 abuts to limit the depth the "mouse" 12 extends into cavity 20 of protective cover 10.

There is a pivotal cover 50 provided with a pair of pivot points 52, FIGS. 2 and 3. Also provided are pivot supports 54, which the pivot posts 52 snap into and pivot upon. Once installed the cover 50 forms the front end of the automobile design shown in FIG. 1. The underside 56 of the pivotal cover 50 has at least one projection 58 which extends downwardly to contact the button or buttons 18. Projection 58 is adjustable whereby the free end barely touches the button 18. There is an opening 60 in the area of the protective cover 10 where projection 58 extends downwardly.

Should there be two or more buttons 18, there is provided a like number of integral levers 62 as shown in FIGS. 4 and 5. Levers 62 each has a projection 58 similar to the projection on cover 50. In FIGS. 4 and 5 levers 62 are cut in the pivotal cover. The cuts 64 are on three sides of the lever 62, leaving one side integral with the cover 50 to function as a pivot hinge for the lever. Other ways of pivoting the levers 62 may also be part of the invention, particularly where the actual hinge does not form part of the invention.

In use, a "mouse" 12 having at least one or more buttons 18 is connected to the "mouse" electronics. A groove or indent 32 extending around the edge of the "mouse" is snapped into detents 32 and 36 in the cavity of protective cover 10 where the "mouse" is held until it is desired to remove it. The lower portions extend below the protection cover 10 where the sensors can make contact with the display screen of a computer to send command signals to the computer. The protective cover 10 covers the upper half of the "mouse," in particular the areas of the "mouse" surrounding the buttons 18 are protected against dust and dirt. The pivotal cover 50 has downwardly extending projections 58 that contact the "mouse" buttons 18 whereby pressure applied to the cover will operate the buttons 18. There may be more than one button 18, therefore the cover 50 may have a like number of levers and projections to contact the buttons.

In another embodiment, FIG. 7, a protective cover 70 is provided with a pair of longitudinal members 72 integral with detents 74. Detents 74 cooperate with detents 30' to snap into indent 32 of a computer mouse 12 (FIG. 3). The longitudinal members 72 rest on the top of the computer mouse to limit the entry of the mouse in the protective cover 70. On the end opposite detents 74 there are pivot supports 76 to receive pivot posts 78.

The pivot posts 78 are pivotally connected to a pivotal cover 50.

Obviously many changes, modifications and variations are possible in light of the above teaching. It is therefore understood that within the scope of claims the invention may be practiced otherwise than as specifically described.

I claim:

1. A protective cover for a hand operated controller device with buttons for operating a computer device where the protective cover shields the hand operated control device from dirt and dust, and the hand operated control device having a front end and a rear end with indents on both the front end and the rear end comprising, a protective cover means having a first pair of opposed walls and a second pair of walls between said first pair of opposed walls to form a cavity in said protective cover means, a pair of opposed detent connecting means on said first opposed walls for attaching in the indents of the front and rear walls of the hand operated controller where the hand operated controller extends beyond a lower edge of said protective cover defined by said first pair of walls and said second pair of walls to expose sensors on the hand operated controller, and at least one pivotal projection means mounted on said protective cover where said projection means extends into said cavity to operate buttons on the hand operated controller.

2. A protective cover as in claim 1 wherein said at least one pivotal projection means having adjustable projections to contact hand operated controllers of different sizes.

3. A protective cover as in claim 2 wherein said protective cover has an opening aligned with the buttons on the hand operated controller, whereby a pivotal cover is pivotably connected to said protective cover and said projection means are mounted on said pivotal cover.

4. A protective cover as in claim 3 wherein a cradle means connects hand operated controllers of different sizes to said protective cover, where said cradle includes an opening for a hand operated controller to project through, and connecting means projecting into said opening to attach to said hand operated controller, and where said cradle means connects to said opposed connecting means on said first opposed walls.

* * * * *